May 12, 1936.  W. O. CHRISTY  2,040,466
UNIVERSAL CLAMP
Filed Sept. 29, 1933
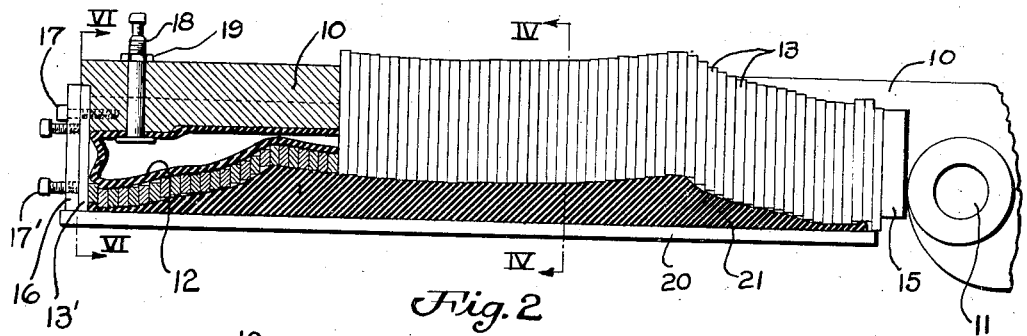
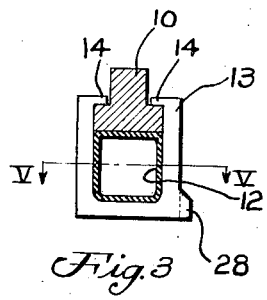
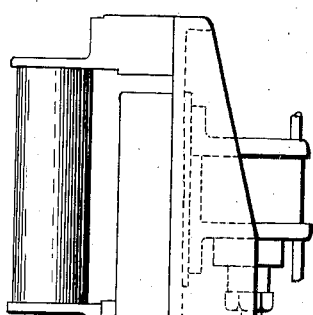
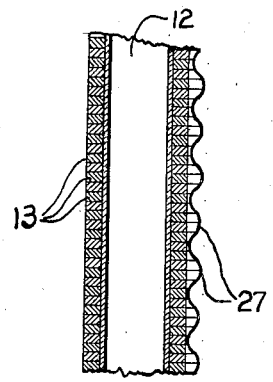
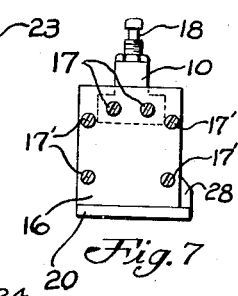
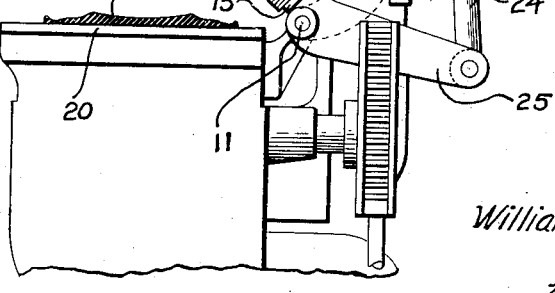
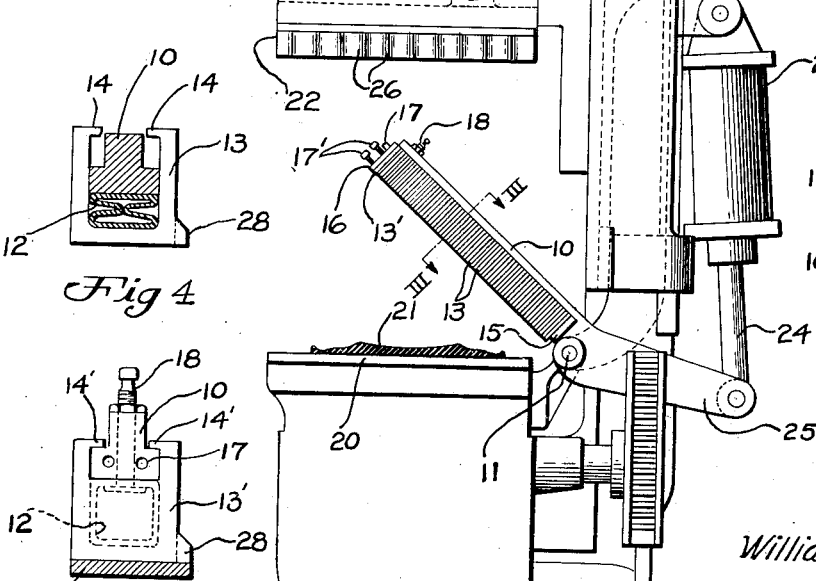
Inventor
William O. Christy
By
Attorney Patented May 12, 1936

2,040,466

UNITED STATES PATENT OFFICE 2,040,466

UNIVERSAL CLAMP

William O. Christy, Akron, Ohio, assignor to Wingfoot Corporation, Wilmington, Del., a corporation of Delaware Application September 29, 1933, Serial No. 691,500

11 Claims. (Cl. 154—9)

This invention relates to a clamp having flexible means associated therewith to permit clamping with substantially equally distributed pressure of articles having irregular surfaces.

An object of the invention is to provide a clamp having surfaces between which an article is to be held, either or both of the surfaces being adapted to flex substantially universally whereby to accommodate an article having an irregular surface, such as a tread band for a pneumatic tire.

Another object is to provide a clamp arm having a longitudinal fluid chamber therein, the fluid being compressible to permit flexing of the arm.

A further object is to provide a clamp adapted to securely hold articles having irregular surfaces and to obtain a substantially uniform distribution of pressure on such surfaces.

A further object is to provide a clamp having a plurality of article-engaging members movable toward and from an article to be clamped, and to provide for adjustment of said members longitudinally of the clamp.

The foregoing and other objects and advantages of the invention will become apparent from the following description in connection with the accompanying drawing, wherein I have shown one embodiment of the invention. In this showing:

Fig. 1 is a partial side elevation of a tread-splicing machine having my clamp associated therewith;

Fig. 2 is a side elevation of the clamp with parts broken away and shown in section, Fig. 3 is a section taken substantially on line 3—3 of Fig. 1, Fig. 4 is a section taken substantially on line 4—4 of Fig. 2 with the tread band and the clamping base omitted, Fig. 5 is a section taken substantially on line 5—5 of Fig. 3.

Fig. 6 is a section taken substantially on line 6—6 of Fig. 2, and

Fig. 7 is an end elevation of the clamp.

Referring to the drawing, it will be noted that I have shown my invention as adapted for use with a tread-splicing machine, such as is disclosed in the co-pending application of J. I. Haase, Ser. No. 525,416, filed March 26, 1931, now Patent No. 2,024,577 dated December 17, 1935, but it will be understood that the invention is capable of many other and varied uses.

The clamp comprises a metallic arm 10 which, in this instance, is formed as an inverted T in cross section, and one end of the arm is provided with means, as indicated at 11, to permit pivotal mounting of the arm whereby it may be swung into and out of clamping position. Arranged against the lower face of this arm, in any suitable manner, is a flexible, fluid-containing member 12 formed of rubber reinforced with fabric, or of any other suitable material, such as is used in air bags utilized in shaping pneumatic tires. This member 12 need not be secured to the arm 10, as will become apparent, although there is no objection to securing it if desired. Member 12 preferably is substantially square in cross section when not flexed and the walls are relatively thick in order to withstand repeated flexing.

A plurality of substantially U-shaped metallic members 13 are mounted for sliding movement with respect to the arm 10 toward and from an object to be clamped. These U-shaped members serve to confine the flexible member within a space defined by the lower face of the arm 10 and the inner faces of the U-shaped members. As shown in Figs. 3 and 4, the U-shaped members have inwardly extending projections 14 which overlap the base of the arm 10 and terminate a short distance from the body portion of this arm. The size of these U-shaped members preferably is such that when the projections 14 are resting on the base of the arm 10, as in Fig. 3, the flexible member will fit snugly in unflexed condition in the space provided therefor. However, this flexible member can, if necessary, require some inflation before filling the space and its function in the device will not be affected thereby.

The members 13 are confined against material longitudinal movement between a laterally projecting flange or lug 15 of arm 10 and a removable securing plate 16 which is of sufficient size to prevent displacement of the members. Plate 16 is secured to arm 10 by bolts 17 or the like, which are threaded into the arm. As clearly shown in Fig. 6, the U-shaped member arranged next to plate 16 is somewhat different from the remaining members and, therefore, will be given the numeral 13' to avoid confusion. This member 13' fits against the bottom face of arm 10 and is provided with projections 14' similar to projections 14. Hence member 13' may be moved longitudinally of arm 10 but cannot slide toward or from the article to be clamped. Container 12 rests against the inner face of member 13' and the latter defines one end of the space containing member 12, the other end of which is defined by the face of lug 15.

It will be apparent that the U-shaped members may easily be assembled with the device by removing plate 16, then sliding the required number of U-shaped members longitudinally into position with their projections overlapping the base of the arm 10, and then securing the plate in position. After the device has been assembled it frequently is necessary to adjust the U-shaped members whereby they will be neither too loose nor too tight and this adjustment is made possible by means of set screws 17' which extend through plate 16 and bear against member 13'. Obviously member 13' may be moved longitudinally of arm 10 by turning screws 17' and the U-shaped members can thereby be adjusted at will.

A valve stem 18 is secured to the flexible member and projects through an opening in arm 10. This stem may be held in position by a nut 19 threaded thereon and it will be apparent that fluid may pass into and out of the flexible member through the stem, and the amount of such fluid retained in the member may be controlled thereby.

Associated with the clamp arm 10 is an article-supporting base 20 which preferably is stationary with respect to arm 10 and in this instance is formed with a flat upper surface adapted to receive an article such as the end portion of a tread band 21.

In the use of the device the article to be clamped is arranged on the base 20 and its irregular surface is placed in contact with the slidable members 13 by swinging the arm 10 about its pivot, as will be understood. Pressure from any suitable source may be utilized to hold the arm in proper position. As the members 13 engage the surface of the article they will slide with respect to the arm 10 toward and from the article to conform to the irregularities of the surface, substantially as shown in Fig. 2. This sliding action of the members is opposed by fluid pressure in the container 12 and this pressure may be regulated and varied through the valve stem 18. It will be observed that the invention permits the article to be engaged and clamped over its entire irregular surface.

The device has particular utility when used with a splicing machine, such as the machine disclosed in the said co-pending application of J. I. Haase, a portion of which is shown in side elevation in Fig. 1. In this machine a pair of the clamping arms is utilized to securely hold in spaced relation the end portions of a tread unit which is to be spliced. The clamping arms are adapted to securely hold the end portions of the tread while they are being trimmed by knives 22 and while the splice is being made. When the clamping device is used with the machine shown in Fig. 1, pressure for holding the arms 10 in proper clamping position is provided by means of a double-acting fluid pressure cylinder 23 having a piston operable therein which is connected to a piston rod 24, the latter being pivotally connected to an arm 25 which may be formed integral with arm 10 or which may be associated therewith in any manner whereby substantially a bell crank arrangement is provided between the arms 10 and 25.

In forming a splice it sometimes is desirable to serrate the ends to be joined. When this is done the knives 22 are serrated as at 26, whereby when they trim the ends of the tread unit those ends will also be serrated. To accommodate these serrated knives as they perform the trimming operation, one edge of the U-shaped members 13 and the base 20 may also be serrated substantially as shown at 27 in Fig. 5. These serrations on the members 13 and base 20, when they are deemed necessary, are preferably formed in projections 28 on said elements (see Figs. 3, 4, 6, and 7). However, it will be apparent that the universal action of the clamping device is the same, regardless of whether or not serrations are provided thereon and the latter therefore are not essential to the operation of the device.

When the clamping device is used with the type of machine shown in Fig. 1 it has been found that the best results are obtained if atmospheric pressure or as much as 35 pounds per square inch is maintained in container 12 to oppose the sliding action of members 13 until after the edges to be spliced have been trimmed. Then the pressure is increased to about 80 pounds per square inch in the container 12, causing the ends of the tread unit to assume a slightly convex contour prior to the splicing operation, whereby these ends can be spliced without trapping air in the splice. However, the amount of pressure in container 12 can be varied to suit the particular article being clamped, depending upon the operations to be performed on the article while clamped and the use to which the article will be put.

If it is desired to clamp an article, two sides of which have irregular surfaces, the pneumatic arrangement may easily be duplicated and applied to both sides simultaneously.

It is believed to be obvious that I have provided a novel clamping device which is substantially universal in its action, which is simple and inexpensive in construction, and which easily may be repaired in case of damage.

Although I have illustrated one form of the invention it will be apparent to those skilled in the art that the invention is not limited to such form, but that various modifications may be made without departing from the spirit of the invention or from the scope of the subjoined claims.

What I claim is:

1. In combination with a base, a clamping arm, a plurality of article-engaging members movable on said arm toward and from an article on said base, and fluid pressure means flexibly opposing movement of said members.

2. In combination with a base, a clamping arm, a plurality of article-engaging members movable on said arm toward and from an article on said base, and pneumatic means arranged between said arm and said article-engaging members to flexibly oppose movement of the latter.

3. In a clamping device of the character described, an arm, a plurality of article-engaging members slidable on said arm toward and from an article to be engaged, and means pneumatically opposing movement of said members.

4. In a clamping device of the character described, an arm, a plurality of article-engaging members movable on said arm toward and from an article to be engaged, a flexible member arranged between said arm and said article-engaging members to oppose movement of the latter, said article engaging members being movable longitudinally on said arm for assembly in proper position, a longitudinally movable pressure member arranged on said arm outwardly of said article engaging members, and means for applying pressure to said last-named member to insure proper longitudinal spacing of said article engaging members.

5. In a clamping device of the character described, an arm, a plurality of article-engaging members movable on said arm toward and from an article to be engaged, and a fluid-pressure-containing member arranged between said arm and said article-engaging members to flexibly oppose movement of the latter.

6. In a clamp of the character described, an arm, a flexible fluid-containing member cooperating with the arm, and a plurality of movable article-engaging members carried by the arm and substantially surrounding the fluid-containing member, the latter flexibly opposing movement of the article-engaging members.

7. In a clamp of the character described, an arm, a flexible member cooperating with one side of the arm, and a plurality of movable article-engaging members carried by the arm and substantially surrounding the flexible member, the latter flexibly opposing movement of the article-engaging members.

8. A clamping member comprising an arm substantially T-shaped in cross section, a plurality of substantially U-shaped article-engaging members mounted on said arm and forming therewith a space defined by the interior surfaces of the U-shaped members and one side of said arm, said U-shaped members being movable to vary the size of said space, and a flexible member in said space opposing movement of the U-shaped members.

9. In combination with a base, a clamping arm, a plurality of flexibly mounted article-engaging members movable on said arm toward and from an article on said base, and means including an inflexible member mounted at one end of the arm for engagement with an adjacent article-engaging member and movable to regulate the longitudinal spacing of said article-engaging members on said arm.

10. In combination with a base, a clamping arm, a plurality of article-engaging members slidable on said arm toward and from an article on said base, means flexibly opposing movement of said members, means for regulating the longitudinal spacing of said members on said arm including a plate mounted at one end of the arm for longitudinal movement thereon, and means for moving the plate longitudinally of the arm.

11. In a clamping device of the character described, an arm, a plurality of article engaging members slidable on said arm toward and from an article to be engaged, means flexibly opposing movement of said members, means for regulating the longitudinal spacing of said members on said arm including a plate mounted at one end of the arm for longitudinal movement thereon, and set screws bearing against said plate to move the latter longitudinally of the arm.

WILLIAM O. CHRISTY.